(12) United States Patent
 Cutler

(10) Patent No.: US 8,749,650 B2
(45) Date of Patent: Jun. 10, 2014

(54) CAPTURE DEVICE MOVEMENT COMPENSATION FOR SPEAKER INDEXING

(71) Applicant: Microsoft Corporation, Redmond, WA (US)

(72) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/708,093

(22) Filed: Dec. 7, 2012

(65) Prior Publication Data

US 2013/0147975 A1     Jun. 13, 2013

Related U.S. Application Data

(62) Division of application No. 11/771,786, filed on Jun. 29, 2007, now Pat. No. 8,330,787.

(51) Int. Cl.
 *H04N 7/14*     (2006.01)
 *H04N 5/232*    (2006.01)
 *H04N 9/80*     (2006.01)

(52) U.S. Cl.
 USPC ............ 348/211.12; 348/14.01; 386/242

(58) Field of Classification Search
 USPC ............ 348/14.01, 14.05, 14.08, 14.1, 14.11,
      348/14.16, 208.99, 208.1, 208.2, 208.14,
      348/208.16, 211.99–211.3, 211.11, 211.12,
      348/211.13; 386/241, 242
 See application file for complete search history.

(56) References Cited

U.S. PATENT DOCUMENTS

| 3,118,340 | A |   | 1/1964  | Iwerks          |
|-----------|---|---|---------|-----------------|
| 4,752,961 | A |   | 6/1988  | Kahn et al.     |
| 4,929,824 | A |   | 5/1990  | Miyazaki        |
| 4,989,466 | A | * | 2/1991  | Goodman ......... 74/5.22 |
| 5,021,818 | A |   | 6/1991  | Satoh et al.    |
| 5,121,426 | A |   | 6/1992  | Baumhauer et al.|
| 5,264,940 | A |   | 11/1993 | Komiya et al.   |
| 5,281,995 | A |   | 1/1994  | Terashita et al.|
| 5,343,246 | A |   | 8/1994  | Arai et al.     |
| 5,353,058 | A |   | 10/1994 | Takei           |
| 5,686,957 | A |   | 11/1997 | Baker et al.    |

(Continued)

FOREIGN PATENT DOCUMENTS

| JP | 59-072295 | 4/1984 |
|----|-----------|--------|
| JP | 08-125835 | 5/1996 |

(Continued)

OTHER PUBLICATIONS

Japanese Notice of Rejection dated Aug. 3, 2012 cited in Appln No. 2010-514961.

(Continued)

*Primary Examiner* — Timothy J Henn
(74) *Attorney, Agent, or Firm* — Andrew Smith; Peter Taylor; Micky Minhas

(57) ABSTRACT

Embodiments of the invention compensate for the movement of a meeting capture device during a live meeting when performing speaker indexing of a recorded meeting. In one example, a first position of a capture device is determined. A second position of the capture device is determined after the capture device has been moved from the first position to the second position. The movement data associated with movement of the capture device from the first position to the second position is determined. The movement data is outputted and used in speaker indexing of the recorded meeting.

20 Claims, 15 Drawing Sheets

(56) References Cited

U.S. PATENT DOCUMENTS

| | | |
|---|---|---|
| 5,787,183 A | 7/1998 | Chu et al. |
| 5,844,599 A | 12/1998 | Hildin |
| 6,040,860 A | 3/2000 | Tamura et al. |
| 6,072,522 A | 6/2000 | Ippolito et al. ............... 348/14.1 |
| 6,192,196 B1 | 2/2001 | Keller |
| 6,192,342 B1 | 2/2001 | Akst |
| 6,211,912 B1 | 4/2001 | Shahraray |
| 6,275,258 B1 | 8/2001 | Chim |
| 6,480,300 B1 | 11/2002 | Aoyama |
| 6,545,699 B2 | 4/2003 | Satoda |
| 6,600,511 B1 | 7/2003 | Kaneko et al. |
| 6,757,442 B1 | 6/2004 | Avinash |
| 6,766,035 B1 | 7/2004 | Gutta |
| 6,771,819 B2 | 8/2004 | DeYoung et al. |
| 6,795,106 B1 | 9/2004 | Cooper |
| 6,844,990 B2 | 1/2005 | Artonne et al. |
| 6,882,971 B2 | 4/2005 | Craner |
| 6,931,113 B2 | 8/2005 | Ortel |
| 6,934,370 B1 | 8/2005 | Leban et al. |
| 6,950,141 B2 | 9/2005 | Mori et al. |
| 7,020,337 B2 | 3/2006 | Viola et al. |
| 7,023,965 B2 | 4/2006 | Oates |
| 7,031,499 B2 | 4/2006 | Viola et al. |
| 7,092,002 B2 | 8/2006 | Farren et al. |
| 7,099,510 B2 | 8/2006 | Jones et al. |
| 7,102,669 B2 | 9/2006 | Skow |
| 7,117,157 B1 | 10/2006 | Taylor et al. |
| 7,197,186 B2 | 3/2007 | Jones et al. |
| 7,206,809 B2 | 4/2007 | Ludwig et al. |
| 7,212,651 B2 | 5/2007 | Viola et al. |
| 7,305,078 B2 | 12/2007 | Kardon |
| 7,362,368 B2 | 4/2008 | Steinberg et al. |
| 7,403,231 B2 | 7/2008 | Kawanishi |
| 7,430,333 B2 | 9/2008 | Yu et al. |
| 7,508,413 B2 | 3/2009 | Nose |
| 7,538,802 B2 | 5/2009 | Lee |
| 7,542,600 B2 | 6/2009 | Yu et al. |
| 7,742,055 B2 | 6/2010 | Phelps |
| 7,778,483 B2 | 8/2010 | Messina et al. |
| 7,782,366 B2 | 8/2010 | Imai |
| 7,796,831 B2 | 9/2010 | Tanaka |
| 7,876,367 B2 | 1/2011 | Muramatsu |
| 7,948,524 B2 | 5/2011 | Endo et al. |
| 8,165,416 B2 | 4/2012 | Cutler |
| 8,330,787 B2 | 12/2012 | Cutler |
| 2001/0028719 A1 | 10/2001 | Hayashi ...................... 381/92 |
| 2002/0033791 A1 | 3/2002 | Arakawa |
| 2003/0018475 A1 | 1/2003 | Basu et al. |
| 2003/0043260 A1 | 3/2003 | Yap et al. |
| 2003/0185424 A1 | 10/2003 | Sato et al. |
| 2003/0234772 A1 | 12/2003 | Zhang et al. |
| 2004/0001137 A1 | 1/2004 | Cutler et al. |
| 2004/0008423 A1 | 1/2004 | Driscoll, Jr. et al. |
| 2004/0021764 A1 | 2/2004 | Driscoll, Jr. et al. |
| 2004/0032796 A1 | 2/2004 | Chu et al. .................... 367/123 |
| 2004/0172255 A1 | 9/2004 | Aoki et al. |
| 2004/0243416 A1 | 12/2004 | Gardos |
| 2004/0254982 A1 | 12/2004 | Hoffman et al. |
| 2004/0263636 A1 | 12/2004 | Cutler et al. |
| 2004/0267521 A1 | 12/2004 | Cutler et al. |
| 2005/0018828 A1 | 1/2005 | Nierhaus et al. |
| 2005/0057666 A1 | 3/2005 | Hu et al. |
| 2005/0178953 A1 | 8/2005 | Worthington et al. |
| 2005/0276270 A1 | 12/2005 | Buinevicius et al. |
| 2006/0204023 A1 | 9/2006 | Stinson et al. |
| 2007/0035632 A1 | 2/2007 | Silvernail et al. |
| 2007/0160357 A1 | 7/2007 | Lin et al. |
| 2007/0206875 A1 | 9/2007 | Ida et al. |
| 2007/0260684 A1 | 11/2007 | Sharma et al. |
| 2007/0266092 A1 | 11/2007 | Schweitzer |
| 2008/0112598 A1 | 5/2008 | Gabara |
| 2008/0255840 A1 | 10/2008 | Cutler |
| 2009/0002476 A1 | 1/2009 | Cutler |
| 2009/0002477 A1 | 1/2009 | Cutler |
| 2009/0003678 A1 | 1/2009 | Cutler |
| 2009/0073275 A1 | 3/2009 | Awazu |

FOREIGN PATENT DOCUMENTS

| | | |
|---|---|---|
| JP | 10-304329 | 11/1998 |
| JP | 2001-296343 | 10/2001 |
| JP | 2003-304589 | 10/2003 |
| JP | 2004-032782 | 10/2004 |
| JP | 2007-005969 | 1/2007 |
| WO | WO 98/47291 | 10/1998 |
| WO | 2005-122632 | 12/2005 |
| WO | WO 2006/030995 | 3/2006 |
| WO | WO 2007/003061 | 1/2007 |
| WO | WO 2009/006004 | 1/2009 |

OTHER PUBLICATIONS

Japanese Notice of Rejection dated Jan. 25, 2013 cited in Appln No. 2010-514961.

U.S. Official Action dated Oct. 3, 2012 cited in U.S. Appl. No. 11/770,713.

U.S. Appl. No. 11/735,674, filed Apr. 16, 2007 entitled "Video Nametags".

U.S. Appl. No. 11/770,713, filed Jun. 28, 2007 entitled "Microphone Array for a Camera Speakerphone".

U.S. Appl. No. 11/771,802, filed Jun. 29, 2007 entitled "Automatic Gain and Exposure Control Using Region of Interest Detection".

U.S. Appl. No. 11/771,786, filed Jun. 29, 2007 entitled "Capture Device Movement Compensation for Speaker Indexing".

Asano et al., "Detection and Separation of Speech Event Using Audio and Video Information Fusion and its Application to Robust Speech Interface"; EURASIP Journal on Applied Signal Processing; Feb. 2004; pp. 1727-1738.

Capin et al., "Camera-Based Virtual Environment Interaction on Mobile Devices"; Lecture Notes in Computer Science, Computer and Information Sciences; ISCIS 2006; 9 pgs.

Chang et al., "Automatic Head-Size Equalization in Panorama Images for Video Conferencing"; Microsoft Research, May 2005; 42 pgs.

Cutler et al., "Distributed Meetings: A Meeting Capture and Broadcasting System"; Month 1-2, 2000; pp. 1-10.

Cutler et al., "Distributed Meetings: A Meeting Capture and Broadcasting System"; Multimedia '02, Dec. 1-6, 2002; pp. 503-512.

Kapralos et al., "Audio-Visual Localization of Multiple Speakers in a Video Teleconferencing Setting"; 2002; 32 pgs.

Lathoud et al., "AV16.3: An Audio-Visual Corpus for Speaker Localization and Tracking"; S. Bengio and H. Bourland (Eds.): MLMI 2004, LNCS 3361; Springer-Verlag Berlin Heidelberg 2005; pp. 182-195.

Microsoft Corporation, "Microsoft Eyes Future of Teleconferencing with RoundTable"; Oct. 26, 2006; 2 pgs.

Nanda et al., "Practical Calibrations for a Real-Time Digital Omnidirectional Camera"; Technical Sketches, Computer Vision and Pattern Recognition, Hawaii, US, Dec. 2001; 4 pgs.

*Updated* Microsoft Announces RoundTable (Formerly RingCam) a 360 Degree "Super Webcam"; posted Jun. 27, 2006 by HSL; 5 pgs.

Yoshimi et al., "A Multimodal Speaker Detection and Tracking System for Teleconferencing"; Dec. 1-6, 2002; Juan-les-Pins France; pp. 427-428.

International Search Report mailed Oct. 29, 2008, Appln No. PCT/US2008/067035.

U.S. Official Action dated Oct. 27, 2010 cited in U.S. Appl. No. 11/735,674.

U.S. Official Action dated Nov. 9, 2010 cited in U.S. Appl. No. 11/771,802.

U.S. Official Action dated Apr. 5, 2011 cited in U.S. Appl. No. 11/735,674.

(56) References Cited

OTHER PUBLICATIONS

U.S. Official Action dated May 20, 2011 cited in U.S. Appl. No. 11/771,802.
U.S. Official Action dated Nov. 4, 2011 cited in U.S. Appl. No. 11/770,713.
U.S. Official Action dated Feb. 23, 2012 cited in U.S. Appl. No. 11/770,713.
U.S. Official Action dated Jun. 6, 2012 cited in U.S. Appl. No. 11/771,786.
U.S. Official Action dated Feb. 13, 2014 in U.S. Appl. No. 11/735,674.

* cited by examiner

CURRENT IMAGE /1202

CURRENT EDGE IMAGE /1204

LAST STATIONARY EDGE IMAGE /1206

ERROR /1208

CURRENT AND LAST STATIONARY EDGE IMAGE ALIGNED /1210

CAPTURE DEVICE MOVEMENT COMPENSATION FOR SPEAKER INDEXING

RELATED APPLICATIONS

This application is a divisional of and claims priority under 35 U.S.C. §120 to application Ser. No. 11/771,786, filed Jun. 29, 2007, entitled CAPTURE DEVICE MOVEMENT COMPENSATION FOR SPEAKER INDEXING, indicated to be issued as U.S. Pat. No. 8,330,787, on Dec. 11, 2012, which is hereby incorporated by reference in its entirety.

BACKGROUND

Meetings are often conducted using videoconferencing systems. A meeting may be conducted using one or more capture devices, such as a video camera and microphone. The meeting may also be recorded and viewed at a later time by the meeting participants or by those who were unable to attend the live meeting.

A meeting recording may be indexed by slides and speaker sites (e.g., conference room 1, remote office 1, remote office 2, etc.). Another method of indexing the meeting recording is by speakers within a conference room (e.g., speaker 1, 2, 3, etc.). To index speakers, a cluster analysis on the sound source localization directions from a microphone array may be performed to determine location and number of speakers in the conference room in reference to a capture device. In one instance, speaker indexing assumes speakers don't change seats or walk around the room during a meeting. Today's speaker indexing works well when the capture device is fixed in place, such as when a video camera is attached to a conference room table.

However, if the capture device is moved during a meeting (e.g., rotated), then the speaker indexing performed on the meeting recording may have flaws. The speaker indexing after the capture device movement may not match the speaker indexing before the capture device movement. Current videoconferencing systems fail to determine when capture device movement occurs and fail to compensate for the capture device movement in speaker indexing.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention compensate for the movement of a capture device during a live meeting when performing speaker indexing of a recorded meeting. In one embodiment, a vision-based method is used to detect capture device movement. Vision-based methods may use image features, edge detection, or object modeling to detect capture device movement. In another embodiment, a hardware-based method is used to determine capture device movement. Hardware-based methods include using accelerometers and/or magnetometers at the capture device. Movement data associated with capture device movement may be applied to speaker indexing.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
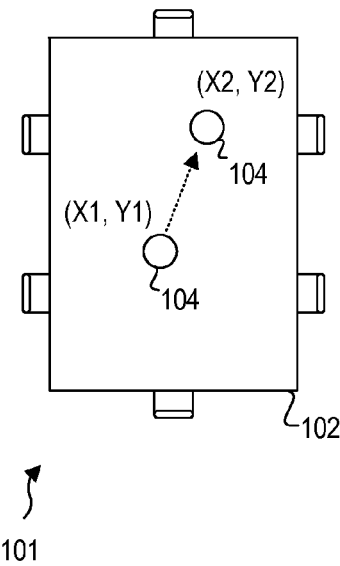
FIG. 1 is a block diagram showing translational movement of a capture device in accordance with an embodiment of the invention.
Figure 2:
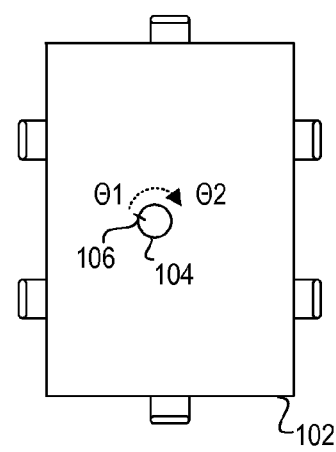
FIG. 2 is a block diagram showing azimuthal movement of a capture device in accordance with an embodiment of the invention.

Overview of a Distributed Meeting System with Capture Device Movement Compensation Turning to FIGS. 1 and 2, examples of capture device movement that may occur when a capture device 104 is recording a live meeting will be discussed. FIGS. 1 and 2 show top views of a table 102 surrounded by six chairs in a conference room 101. Capture device 104 is on top of table 102 for capturing audio and video of a meeting conducted in conference room 101. In one embodiment, capture device 104 includes an omni-directional camera and at least one microphone for capturing audio and video. An example capture device is described below in conjunction with FIG. 16.

In FIG. 1, capture device 104 is moved translationally while capturing a meeting. Video capture device 104 is moved from a first position (shown by (X1,Y1)) to a second position (shown by (X2,Y2)). It will be appreciated that translational movement may also include a Z-direction. It will also be appreciated that capture device movement may also include tilting of video capture device 104. In FIG. 2, video capture device 102 is moved azimuthally from azimuth θ1 to azimuth θ2, where the azimuth is measured in reference to reference point 106 on capture device 104. In another example, only the camera portion of capture device 104 is moved, but the base of capture device 104 remains stationary.

Figure 3:
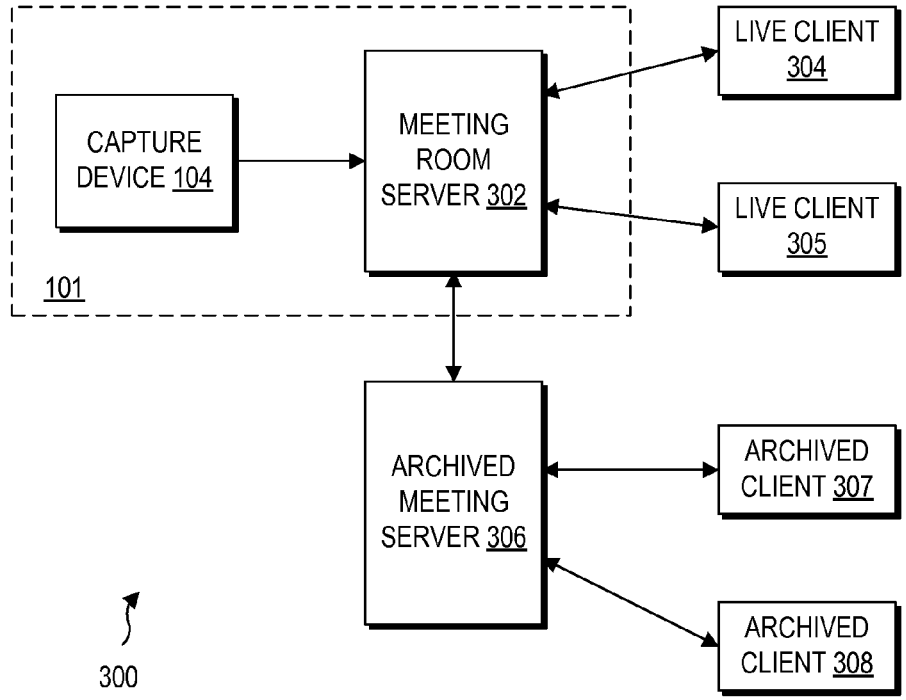
FIG. 3 is a block diagram of a distributed meeting system in accordance with an embodiment of the invention.

Turning to FIG. 3, a distributed meeting system 300 in accordance with embodiments of the invention is shown. One or more computing devices of system 300 may be connected by one or more networks. System 300 includes a meeting room server (e.g., a PC, a notebook computer, etc.) 302 connected to capture device 104. Capture device 104 captures the audio and video of meeting participants in room 101. Live meeting clients 304 and 305 are also connected to meeting room server 302 when a meeting is conducted. Live meeting clients 304 and 305 enable remote users to participate in a live meeting. Audio and video from capture device 104 may be sent to live meeting clients 304 and 305 by server 302 during the live meeting. Video and/or audio of users at live meeting clients 304 and 305 may be sent to meeting room server 302 using capture devices (not shown) at live meeting clients 304 and 305. Meeting room server 302 may record the audio/video captured by capture device 104. Meeting room server 302 is connected to archived meeting server 306. Archived meeting server 306 may archive the recorded meeting.

Meeting room server 302 may perform video post-processing including speaker indexing with capture device movement compensation as described herein. In alternative embodiments, other computing devices, such as archived meeting server 306 or capture device 104, may perform capture device movement compensation as described herein. An example computing device for implementing one or more embodiments of the invention is discussed below in conjunction with FIG. 18.

In system 300, archived meeting clients 307 and 308 may connect to archived meeting server 306 for viewing a recorded meeting. The recorded meeting may have received post-processing which may include speaker indexing. The speaker indexing may use embodiments of capture device movement compensation as described herein.

Figure 4:
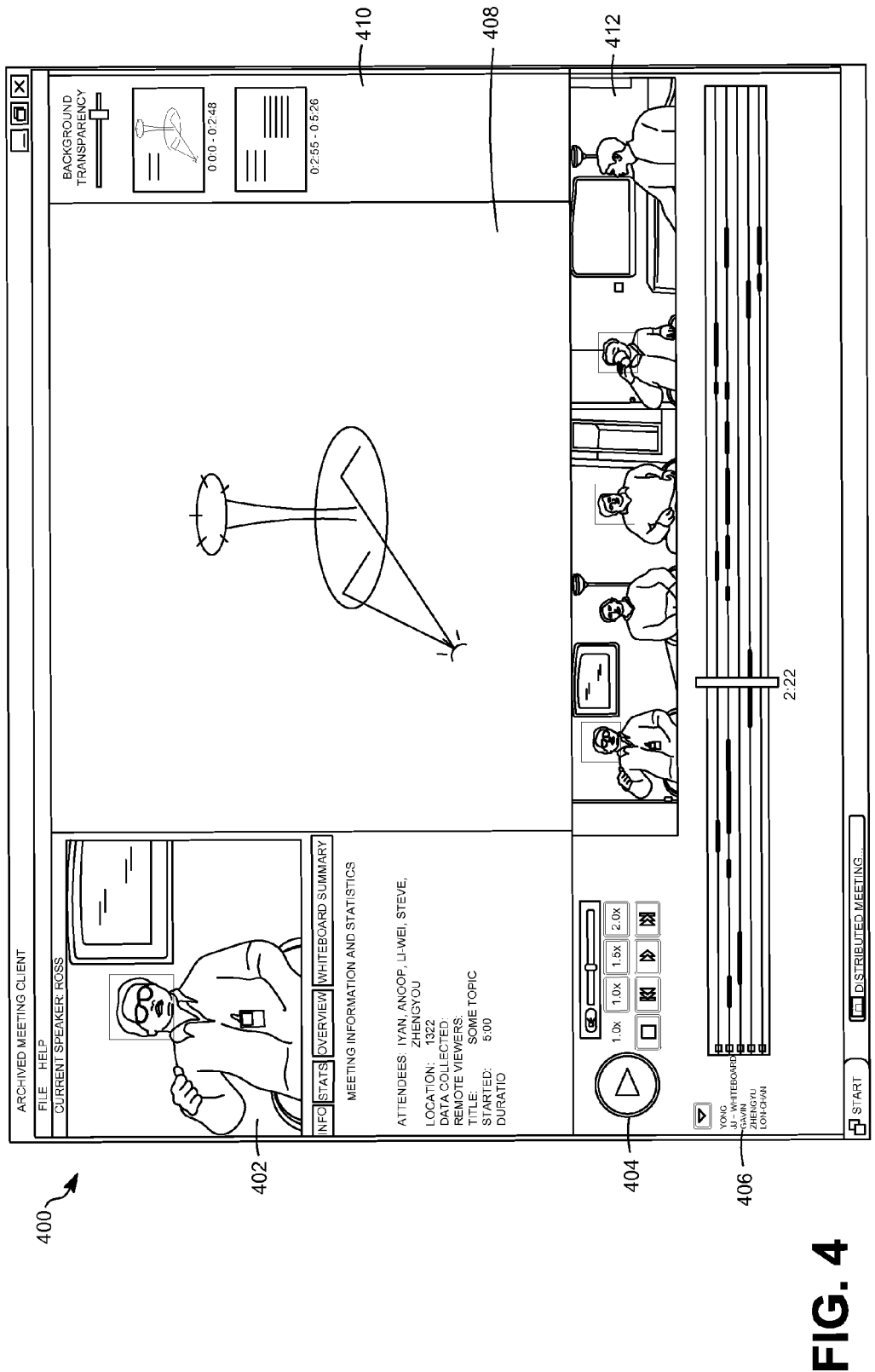
FIG. 4 is a user interface for an archived meeting client in accordance with an embodiment of the invention.

Turning to FIG. 4, an embodiment of an archived meeting client User Interface (UI) 400 is shown. UI 400 may be used to view a recorded meeting. UI 400 includes speaker video 402, playback controls 404, meeting timeline 406, whiteboard image 408, whiteboard key frame table of contents 410, and panoramic view 412. Live meeting clients 304 and 305 have UIs similar to UI 400 during the live meeting except they may not include meeting timeline 406 and whiteboard key frame table of contents 410.

Speaker video 402 shows video of the current speaker in the video recording. This video may have been captured by capture device 104 in room 101, by another capture device in room 101, or a capture device at a remote live client 304.

Playback controls 404 allow the user to adjust the playback of the recorded meeting, such as fast forward, rewind, pause, play, play speed (e.g., 1.0×, 1.5×, 2.0×), volume control and the like. In one embodiment, when play speed is increased, the speaker's voice is played without changing the speaker's voice pitch. In another embodiment, the play speed may be selected on a per-person basis (e.g., whenever speaker 1 speaks, play speed is 1.0×, but whenever speaker 2 speaks, play speed is 1.5×). In yet another embodiment, time compression may be applied to the recorded meeting to remove pauses to enhance the playback experience.

Whiteboard image 408 shows the contents of a whiteboard in room 101. Pen strokes on the whiteboard are time-stamped and synchronized to the meeting audio/video. Key frames for the whiteboard are shown in whiteboard key frame table of contents 410. Panoramic view 412 shows video captured by capture device 104.

Meeting timeline 406 shows the results of speaker segmentation. Speakers at the meeting are segmented and assigned a horizontal line (i.e., an individual speaker timeline) in meeting timeline 406. Speakers can be filtered using checkboxes so only the selected speakers will playback. Playback speed for each individual speaker may also be selected. Also, a separate line in meeting timeline 406 may show special events such as key frames, annotations, projector switch to shared application, and the like. A user may click on a position in meeting timeline 406 to jump the playback to the selected timeline position. Speaker segmentation in meeting timeline 406 is producing using speaker indexing. Speaker indexing uses speaker clustering techniques to identify the number of speakers at a meeting and the speaker locations in relation to a video recording. The speaker segmentation in meeting timeline 406 has been adjusted for capture device movement during the live meeting using embodiments as described herein.

Figure 5:
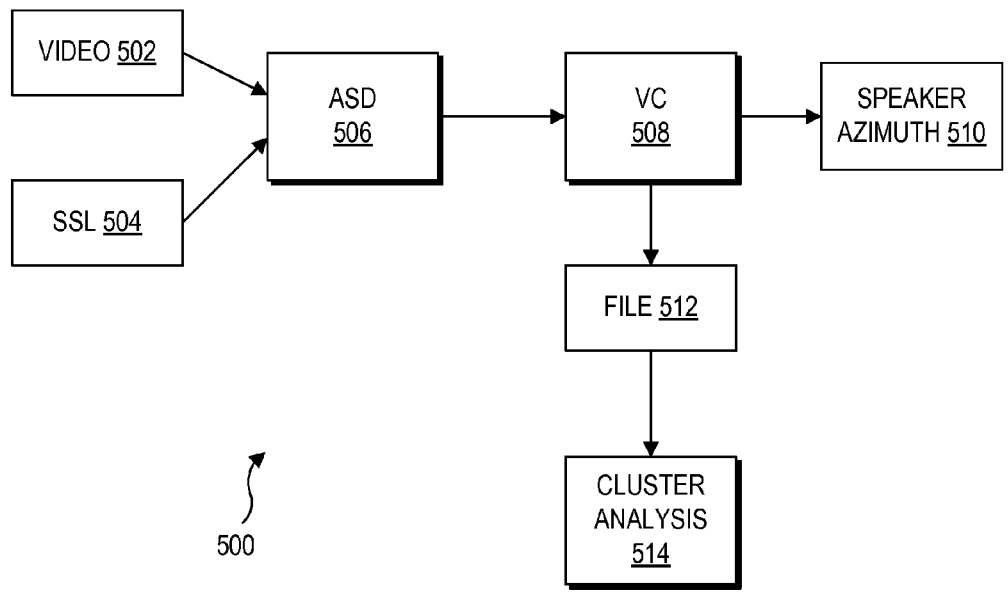
FIG. 5 is a block diagram of a speaker indexing system in accordance with an embodiment of the invention.

In FIG. 5, a speaker indexing system 500 is shown that uses cluster analysis. An Active Speaker Detector (ASD) 506 receives real-time video footage 502 and real-time Sound Source Localization (SSL) 504 as input. SSL 504 analyzes the microphone array audio captured during the meeting and detects when a meeting participant is talking. SSL 504 may be input as a probability distribution function. ASD 506 analyzes video 502 and SSL 504 and determines when each meeting participant is talking.

Virtual Cinematographer (VC) 508 takes the determination made by ASD 506 and applies further analysis and cinemagraphic rules to compute a speaker azimuth 510 for each speaker, where the speaker azimuth is referenced from capture device 104. VC 508 is used for real-time speaker control. Cluster analysis is performed during post processing. As shown in FIG. 5, audio/video information is stored in a file 512 by VC 508. In post-processing, cluster analysis module 514 may use file 512 to perform cluster analysis for use in playback of the recorded videoconference. File 512 may include information for performing capture device movement compensation as described in embodiments herein.

Figure 6:
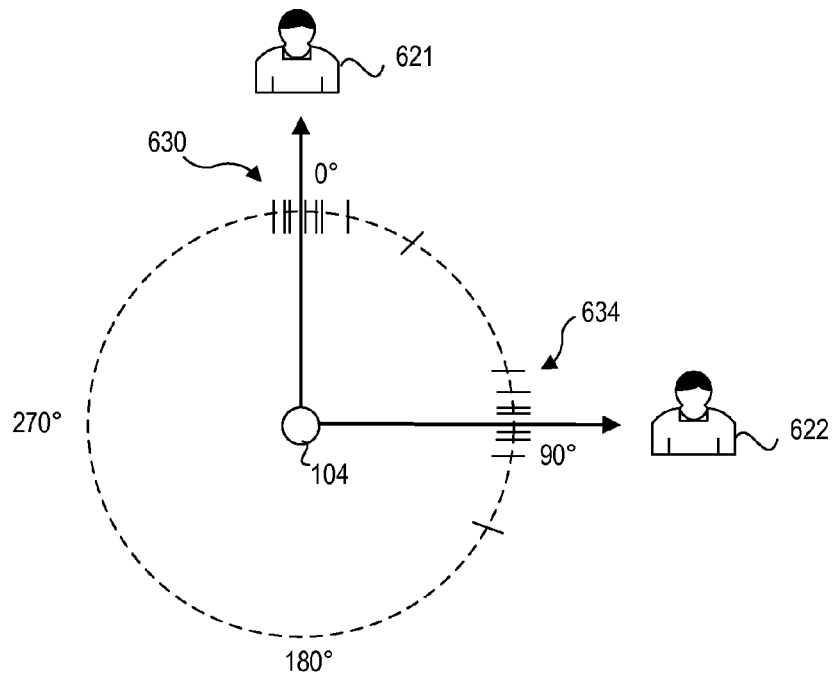
FIG. 6 is a block diagram of cluster analysis in accordance with an embodiment of the invention.

FIG. 6 shows an embodiment of cluster analysis. User 621 is at azimuth 0 degrees from capture device 104 and user 622 is at azimuth 90 degrees from capture device 104. By analyzing the recorded audio and video, the cluster analysis algorithm finds a cluster of speaking near azimuth 0 degrees, as shown at 630. Another cluster of speaking is found near azimuth 90 degrees, as shown at 634. The cluster analysis algorithm determines that user 621 is at azimuth 0 degrees and user 622 is at azimuth 90 degrees from capture device 104. This speaker indexing may then be used to produce the speaker segmentation in meeting timeline 406 of UI 400.

However, if capture device 104 is rotated 30 degrees to the right during the live meeting, then the speaker indexing after the device movement will be 30 degrees off. This will cause problems in the video playback in UI 400. Embodiments of the invention compensate for such device movement to provide users a robust and high-quality playback experience.

Figure 7:
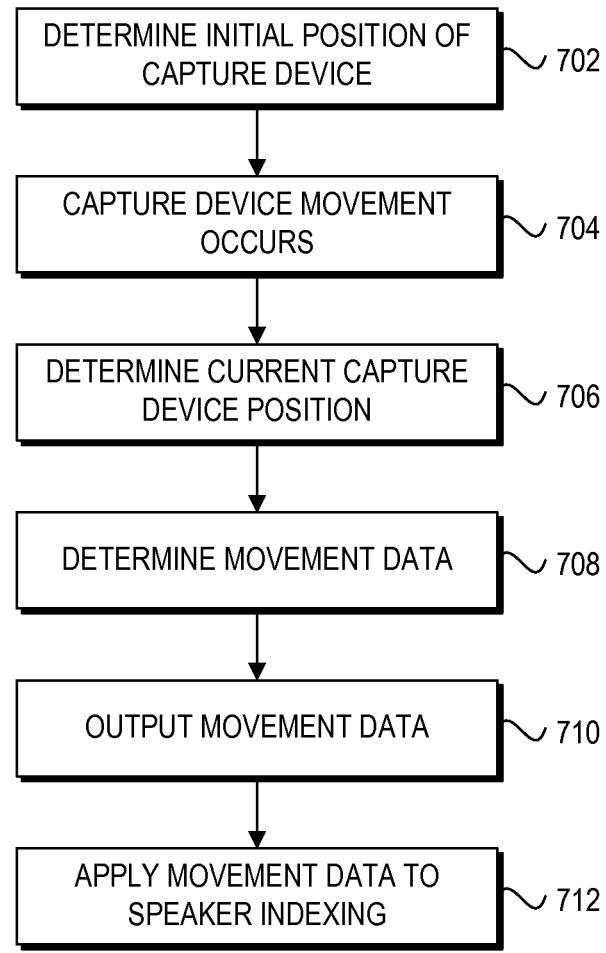
FIG. 7 is a flowchart showing the logic and operations of capture device movement compensation in accordance with an embodiment of the invention.

Turning to FIG. 7, a flowchart 700 shows the logic and operations of capture device movement compensation for speaker indexing in accordance with an embodiment of the invention. Vision-based and hardware-based implementations of flowchart 700 are discussed below. In one embodiment, at least a portion of the logic of flowchart 700 is performed during post-processing of a recorded meeting. In alternative embodiments, capture device motion compensation as described herein may be conducted during a live meeting.

Starting in block 702, the initial position of the capture device is determined. Proceeding to block 704, capture device movement occurs. Next, in block 706, the current position of the device is determined Next, in block 708, movement data associated with the movement of the capture device from the initial position to the current position is determined This movement data may indicate a change in the translational position of the capture device (e.g., $\Delta X$, $\Delta Y$, and/or $\Delta Z$), a change in the azimuth of the capture device (e.g., $\Delta \theta$), and/or a change in camera tilt angle. Proceeding to block 710, the movement data is outputted.

Next, in block 712, the movement data is applied to speaker indexing. In one embodiment, the movement data may be applied to audio/video that occurs after the capture device movement. For example, if the capture device rotated 30 degrees, then speaker indexing after the device movement may be corrected by 30 degrees. It will be appreciated that this correction technique may lead to integration error (i.e., compounding of multiple errors) when multiple movements of the device occur during a recorded meeting.

In another embodiment, the clustering analysis of the recorded meeting may be restarted after the movement of the device is detected. This correction technique may reduce integration errors in video playback, but may be computationally expensive. In restarting the cluster analysis, the resulting speaker segmentation may be used to generate multiple timelines corresponding to each time the capture device is moved (e.g., if the capture device was moved once during a live meeting, then restarting the cluster analysis may result in two timelines). The results may be displayed as two separate timelines in UI 400. For example, if the capture device moved at time t1, then meeting timeline 406 may show a new set of speakers starting at time t1. Alternatively, the results may be merged into a single timeline in UI 400. To merge the timelines, movement data may be used to correlate speaker 1 in timeline 1 to the same speaker 1 in timeline 2. For example, if the movement data indicates capture device 104 rotated 45 degrees clockwise, then the logic may use this movement data to match speakers from the two timelines.

Vision-Based Movement Detection

Figure 8:
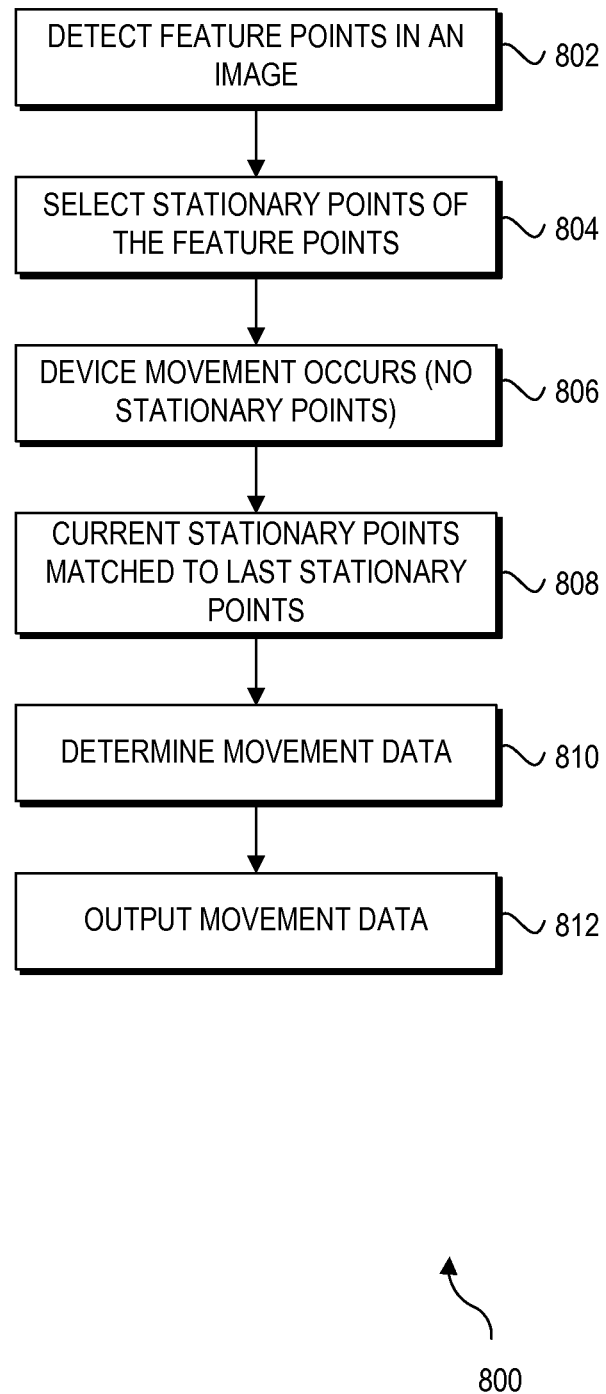
FIG. 8 is a flowchart showing the logic and operations of capture device movement compensation in accordance with an embodiment of the invention.

Turning to FIG. 8, a flowchart 800 shows the logic and operations of capture device movement compensation in accordance with an embodiment of the invention. In one embodiment, at least a portion of the logic of flowchart 800 may be implemented by computer readable instructions executable by one or more computing devices. At least a portion of the logic of flowchart 800 may be conducted during the post-processing of a recorded meeting.

Starting in block 802, feature points in an image captured by capture device 104 are detected. Continuing to block 804, one or more stationary points of the feature points are selected. The stationary points are selected from the feature points that do not move over a period of time.

Next, in block 806, device movement occurs. Device movement may be detected from the image because during device movement there are no stationary points. Next in block 808, current stationary points are detected and matched to the last stationary points before device movement. Matching of current C(i) and last L(i) stationary points may be conducted using a Hough transform and a rotation (i.e., azimuth) camera motion model. For example, to determine if point C(i) matches point L(j) let $$M(i, \theta) = \begin{cases} 1 & \text{if } \|R(L(i), \theta) - C(j)\| < T \\ 0 & \text{otherwise} \end{cases}$$

for some distance threshold T with points L rotated by $\theta$. The Hough transform is then arg $\max_\theta \Sigma_i \Sigma_j M(i,\theta)$.

Proceeding to block 810, movement data is determined from the comparison of the last and current stationary points. The movement data is then output, as shown in block 812.

In one embodiment, flowchart 800 assumes mostly azimuthal (i.e., rotational) movement of capture device 104, but limited translational movement (e.g., less than approximately 20 centimeters translational movement of the device). One skilled in the art having the benefit of this description will appreciate that flowchart 800 may be extended to include translation and camera tilt/orientation movement in the Hough transform.

Figure 9:
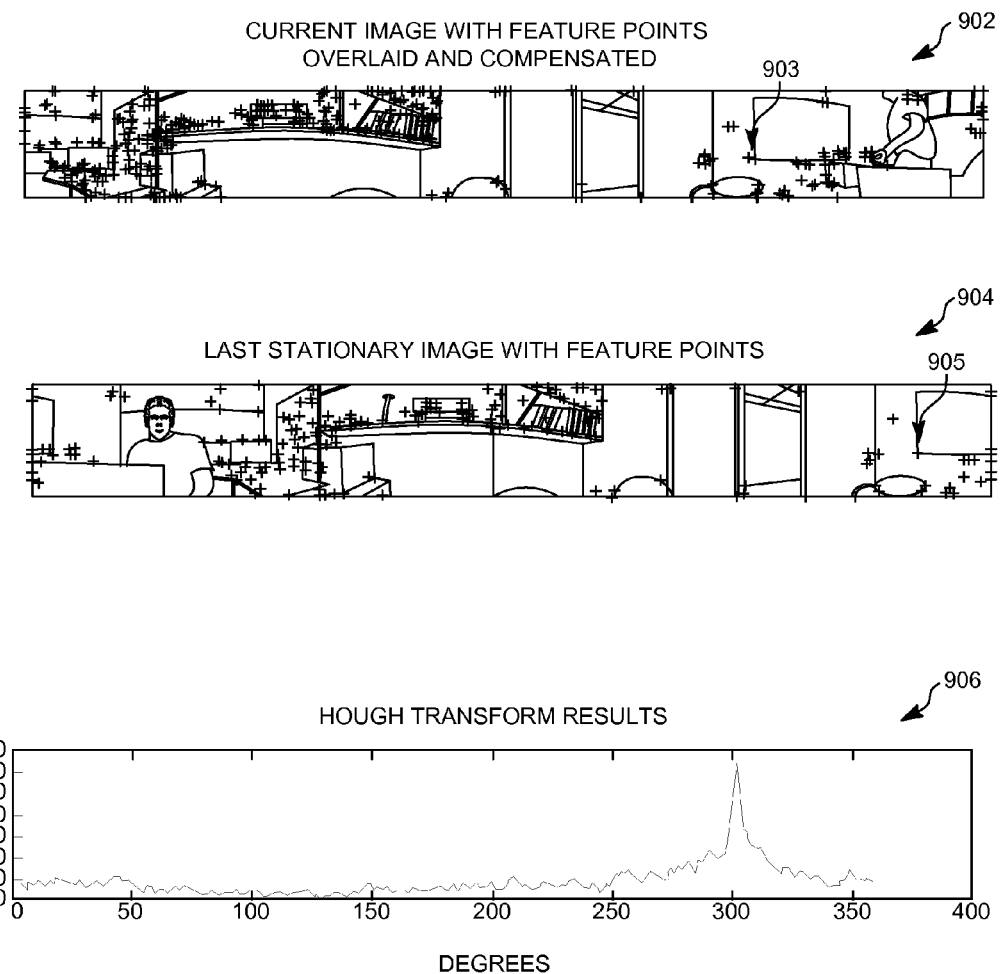
FIG. 9 shows an example of capture device movement compensation in accordance with an embodiment of the invention.

Turning to FIG. 9, an example of determining capture device movement using stationary feature points is shown. In the last stationary image 904, stationary feature points have been identified in the image. For example, a corner of the whiteboard, shown at 905, has been identified as a stationary point. Last stationary image 904 has a reference azimuth of 0 degrees.

At 902, the current image after capture device movement has occurred is shown. Also at 902, stationary feature points from current image 902 have been aligned with stationary features points from last stationary image 904. As shown at 903, the corner of the whiteboard has been used as a stationary point for aligning the images. Hough transform results, shown at 906, indicate the capture device azimuth has changed to 300 degrees (i.e., the device has been turned 60 degrees to the left).

Figure 10:
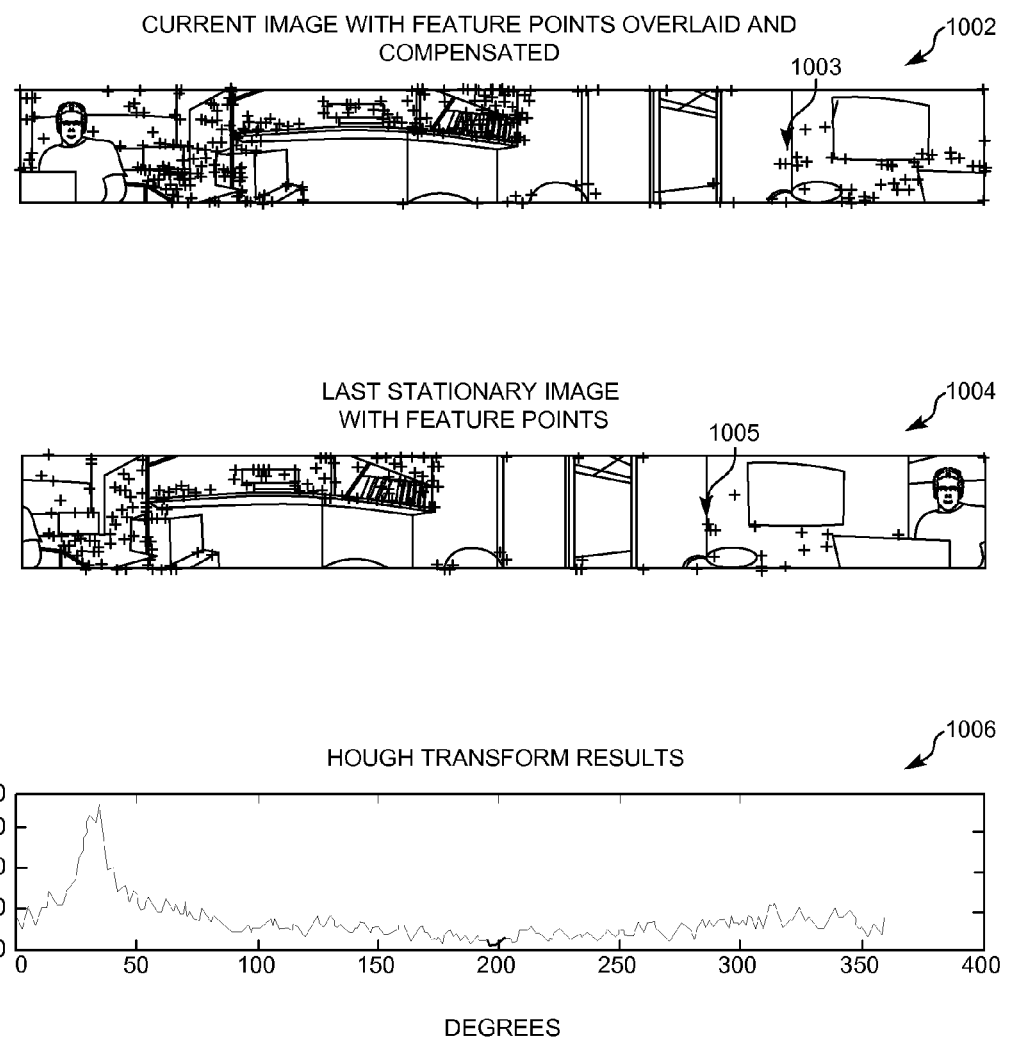
FIG. 10 shows an example of capture device movement compensation in accordance with an embodiment of the invention.

Turning to FIG. 10, an example of determining capture device movement using stationary feature points is shown. In last stationary image 1004, stationary feature points have been identified in the image. For example, a door knob, shown at 1005, has been identified as a stationary point. Image 1004 has a reference azimuth of 0 degrees.

Image 1002 shows the current image after movement has occurred. Stationary points from current image 1002 have been aligned with stationary points from the last stationary image 1004. As shown at 1003, the doorknob has been used as a stationary point for aligning the images. Hough transform results, shown at 1006, indicate the capture device azimuth has rotated to 035 degrees (i.e., the device has been rotated 35 degrees to the right).

Figure 11:
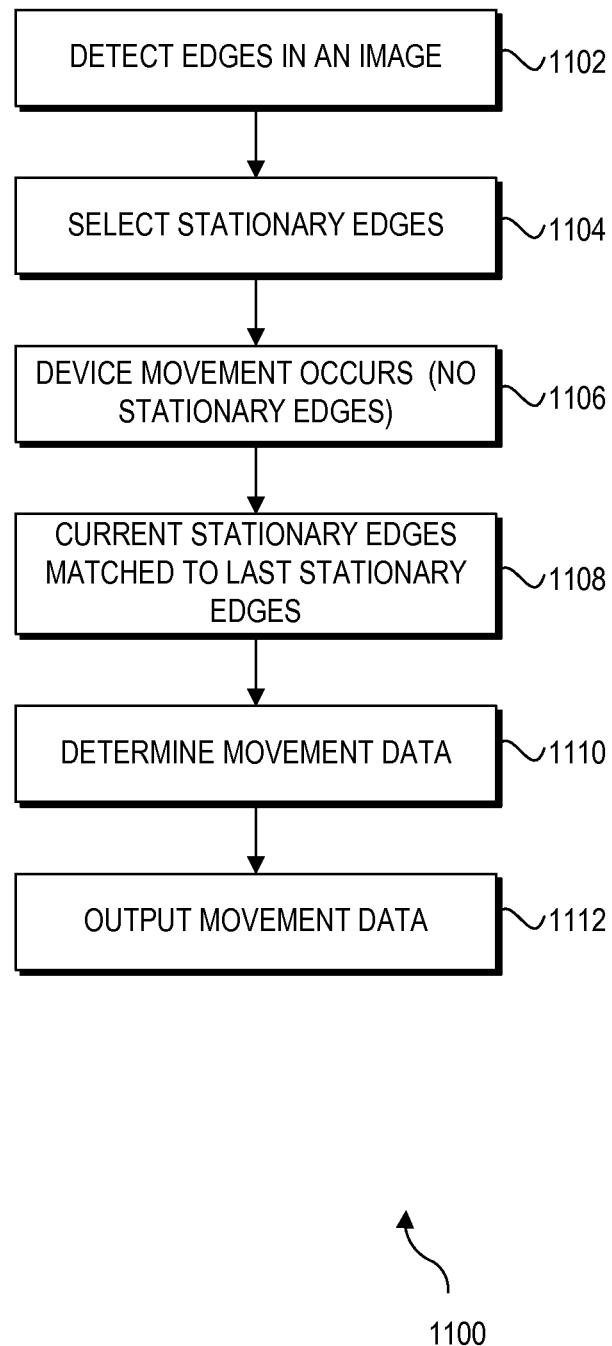
FIG. 11 is a flowchart showing the logic and operations of capture device movement compensation in accordance with an embodiment of the invention.

Turning to FIG. 11, a flowchart 1100 shows the logic and operations of capture device movement compensation using a correlation based technique (as opposed to a feature based technique) in accordance with an embodiment of the invention. In one embodiment, at least a portion of the logic of flowchart 1100 may be implemented by computer readable instructions executable by one or more computing devices. At least a portion of the logic of flowchart 1100 may be conducted during the post-processing a recorded meeting.

In one embodiment, flowchart 1100 assumes azimuthal camera motion and little translational motion. One skilled in the art having the benefit of this description will appreciate that flowchart 1100 may be extended to include translation and camera tilt/orientation movement to the Hough transform.

Starting in block 1102, the edges in an image are detected and an edge image is produced. In one embodiment, an edge detector (such as Canny edge detection) is used as a feature detector. The edges are filtered over time to detect stationary edges and spatially smoothed. Next, in block 1104, the stationary edges are selected from the edge image. Proceeding to block 1106, capture device movement occurs. During device movement, there are no stationary edges. Next, in block 1108, stationary edges in the current edge image (after capture device movement) are matched to the stationary edges in the last stationary edge image. In one embodiment, a Hough transform is used to determine the best azimuth that minimizes image correlation error. Proceeding to block 1110, from this matching, movement data for the capture device is determined. Next, in block 1112, the movement data is outputted.

It will be appreciated that edge detection in flowchart 1100 may be distinguished from using feature points as described in flowchart 800.

Figure 12:
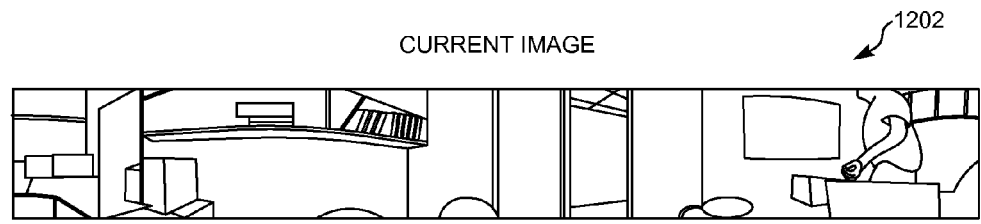
FIG. 12 shows an example of capture device movement compensation in accordance with an embodiment of the invention.
Figure 12:
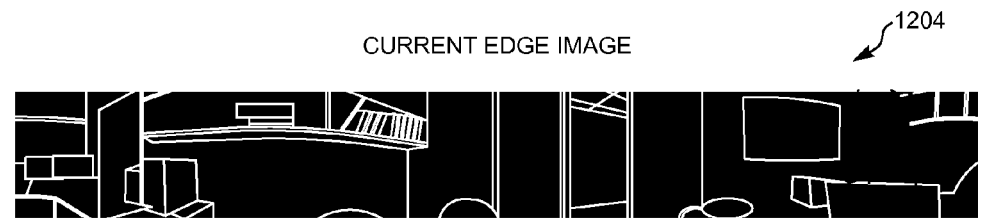
Figure 12:
Figure 12:
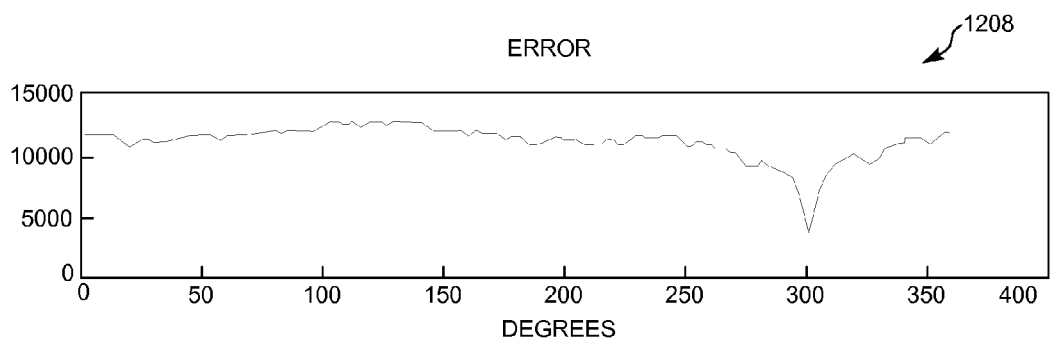
Figure 12:

Turning to FIG. 12, an example of determining capture device movement using stationary edges is shown. The current camera image 1202 is shown. The current edge image 1204 has been derived from camera image 1202. The last stationary edge image 1206 is compared to the current edge image 1204 (as shown by alignment image 1210). Hough transform results, shown at 1208, indicate the least correlation error at azimuth 300 degrees. Thus, the capture device has been rotated to 300 degrees (i.e., the device has been turned 60 degrees to the left).

Figure 13:
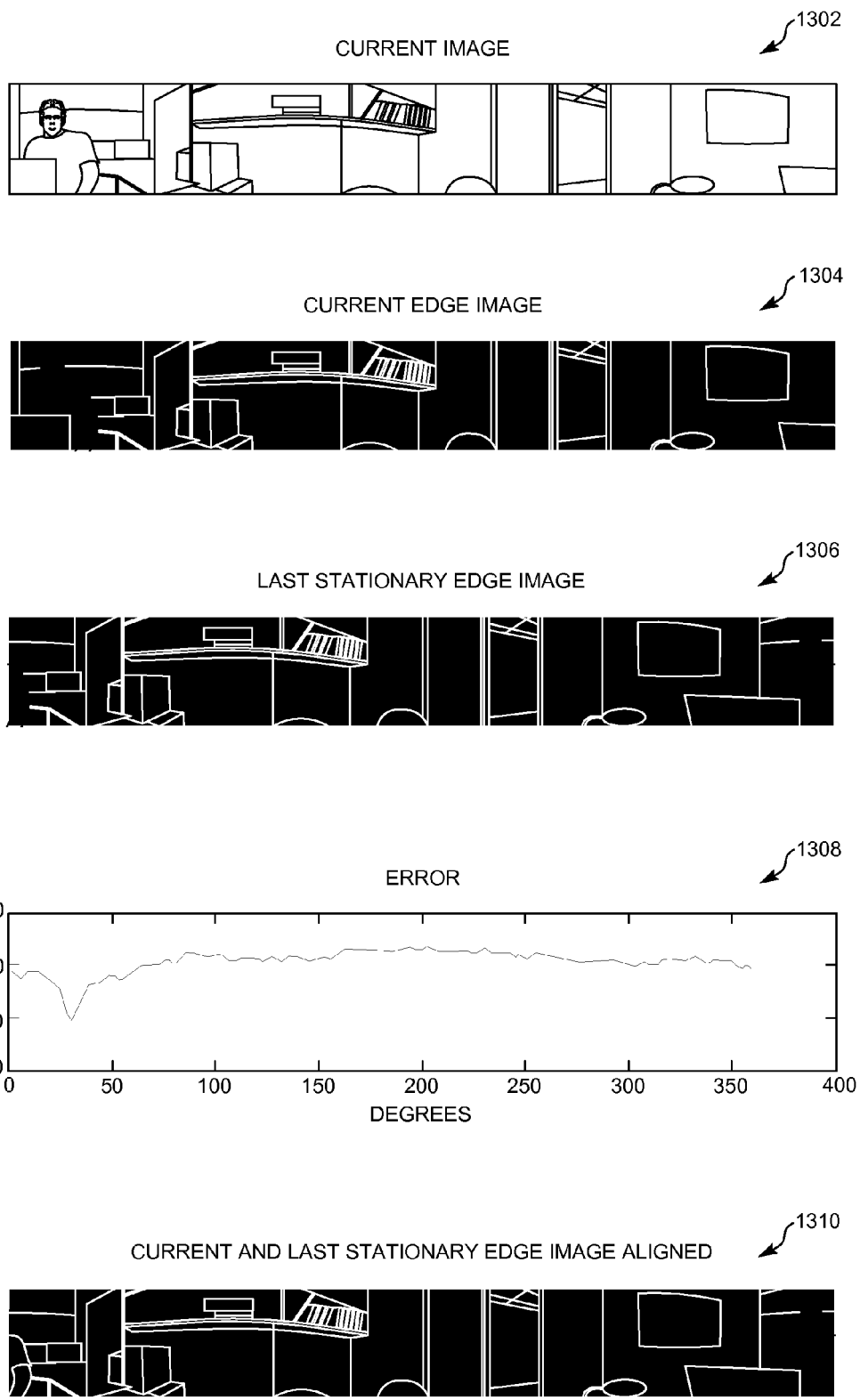
FIG. 13 shows an example of capture device movement compensation in accordance with an embodiment of the invention.

Turning to FIG. 13, an example of determining capture device movement using stationary edges is shown. The current camera image 1302 is shown. The current edge image 1304 has been derived from camera image 1302. The last stationary edge image 1306 is compared to the current edge image 1304 (as shown by alignment image 1310). Hough transform results, shown at 1308, indicate the least correlation error at azimuth 030 degrees. Thus, the capture device has been rotated to 030 degrees (i.e., the device has been turned 30 degrees to the right).

Figure 14:
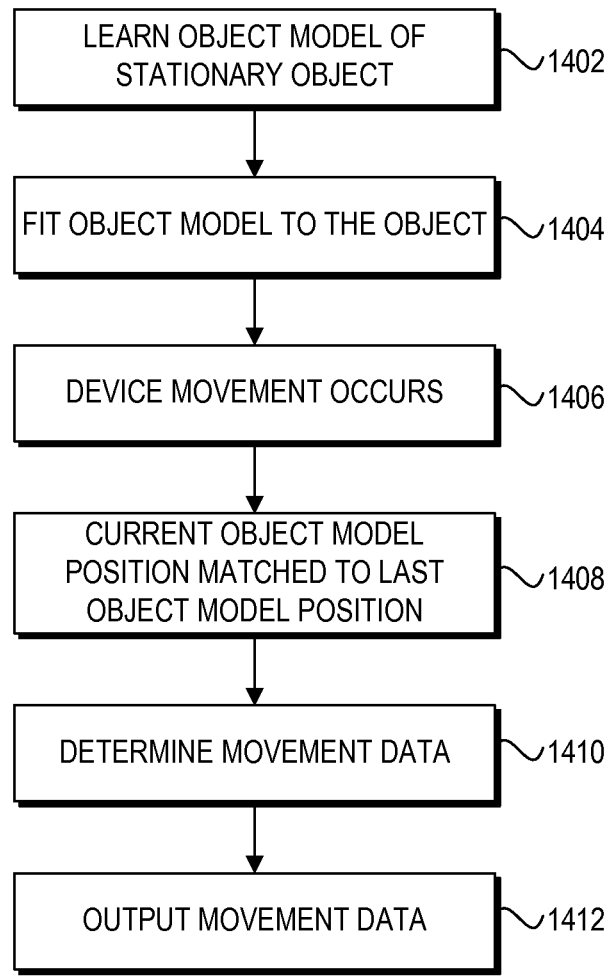
FIG. 14 is a flowchart showing the logic and operations of capture device movement compensation in accordance with an embodiment of the invention.

Turning to FIG. 14, a flowchart 1400 shows the logic and operations of capture device movement compensation using object modeling in accordance with an embodiment of the invention. In one embodiment, at least a portion of the logic of flowchart 1400 may be implemented by computer readable instructions executable by one or more computing devices. At least a portion of the logic of flowchart 1400 may be conducted during the post-processing of a recorded meeting.

In one embodiment, the logic of flowchart 1400 determines the size and orientation of the meeting room table that the capture device is positioned on. The capture device learns a table model parametrically and then fits the model to the table during the meeting or during post-processing, including table orientation and table position. Tests show robust results in normal lighting conditions and with 50% random occlusions of the table in the image (e.g., the open laptop of a meeting participant may partially block the capture device's view of the table).

Starting in block 1402, an object model is learned from an image of a stationary object in the meeting room captured by the capture device. Proceeding to block 1404, the object model is fit to the stationary object. Next, in block 1406, capture device movement occurs. Device movement may be detected by comparing the model parameters of the current and previous frames.

Continuing to block 1408, the current object model is matched again to the corresponding stationary object. The current object model position is matched to the last object model position. Next, in block 1410, movement data is determined from the change in object model positions. Then the movement data is outputted, as shown in block 1412.

Figure 15:
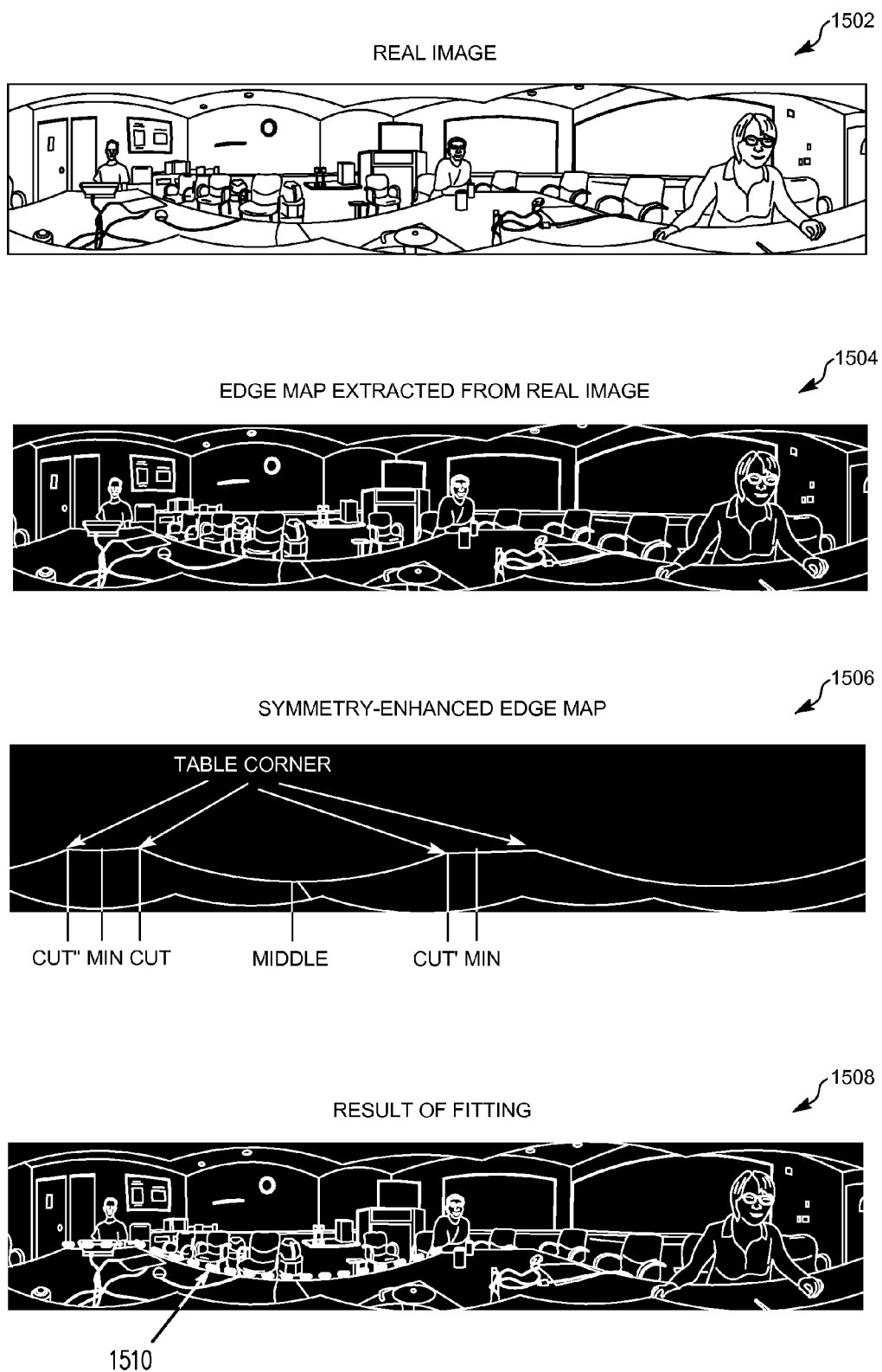
FIG. 15 shows an example of capture device movement compensation in accordance with an embodiment of the invention.

Turning to FIG. 15, an example of object modeling using a conference room table is shown. It will be appreciated that embodiments of stationary object modeling are not limited to modeling tables. In FIG. 15, a real image from the capture device is shown at 1502. At 1504, an edge map has been extracted from the real image. The edge map includes noise (i.e., edges of other objects such as people, doors, etc.) in addition to the edges of the table boundaries of the table of interest. To filter the edge map, it is observed that most conference tables are bilaterally symmetric. This symmetry is used to filter out the noise.

The filtering operation uses a symmetry voting scheme to filter out the noise in the edge map. After applying the filtering operation to the edge map shown at 1504, a symmetry-enhanced edge map is produced, as shown at 1506.

A fitting algorithm is used to fit the symmetry-enhanced edge map to the table in the edge map shown at 1504. In one embodiment, a trigonometry fitting is used. Points on two of the four table edges are used. As shown in 1506, a first section of table is between cut and cut" and a second section of table is between cut and cut'. A limitation of the trigonometry fitting is that it assumes a rectangular table. In another embodiment, a quadratic fitting is used. The quadratic fitting does not assume the shape of the table. In quadratic fitting, two quadratic curves are used to fit the table edge points.

The result of a fitting algorithm is shown at 1508. A table model 1510 (shown as a dotted-line curve) has been fit to the table in the edge map. After device movement occurs, table model 1510 may be re-aligned to the table in the current edge map. The difference between the last stationary table model position and the current table model position may be used to determine the movement of the capture device.

It is noted that under some conditions, such as low-lighting or insufficient visual texture (e.g., a mostly white room), vision-based motion detection methods may have limitations. Still, under such conditions, the vision-based methods may detect that the capture device has moved, but may not necessarily be able to determine the movement data. In such cases, the speaker indexing may be reset when motion has been detected and the cluster analysis will be restarted.

Hardware-Based Movement Detection

Figure 16:
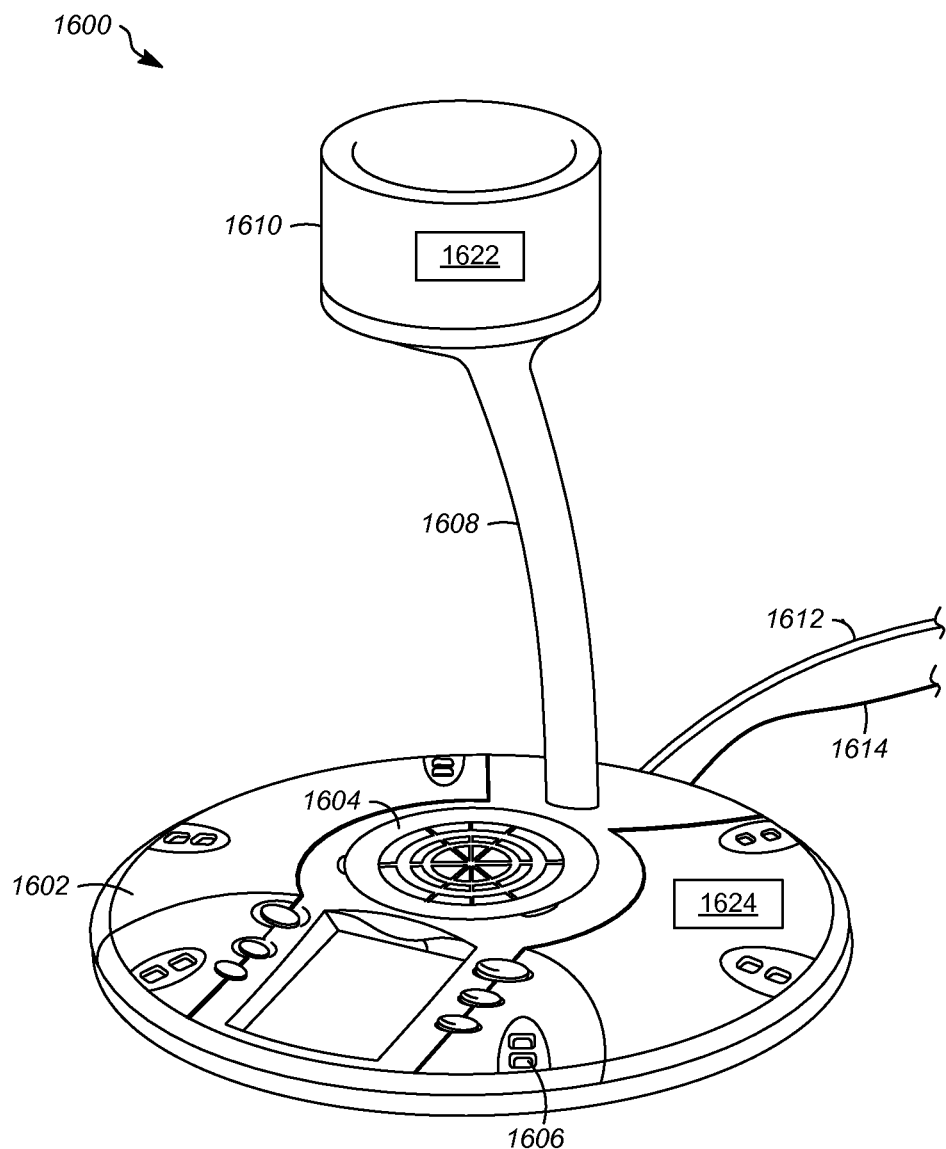
FIG. 16 shows a capture device in accordance with an embodiment of the invention.

Turning to FIG. 16, an embodiment of a capture device 1600 is shown. As will be discussed below, capture device 1600 may include a magnetometer and/or an accelerometer for use in device movement compensation for speaker indexing. It will be appreciated that capture device 1600 is not limited to the design shown in FIG. 16.

Capture device 1600 includes a base 1602 coupled to a neck 1608 which in turn is coupled to a head 1610. Base 1602 includes a speaker 1604 and one or more microphones 1606. Capture device 1600 may be powered using power cord 1614.

A cable 1612 (e.g., USB, IEEE 1394, etc.) may connect capture device 1600 to another computing device, such as meeting room server 302. Alternatively, capture device 1600 may connect to another computing device wirelessly. Head 1610 may include an omni-directional camera that captures 360 degrees of video. The omni-directional camera may have several individual cameras. The images from each camera may be stitched together to form a panoramic view.

Capture device 1600 may include one or more accelerometers and/or one or more magnetometers. In the embodiment of FIG. 16, head 1610 includes a magnetometer 1622 and base 1602 includes an accelerometer 1624. In one embodiment, magnetometer 1622 is a 2-axis magnetometer and accelerometer 1624 is a 3-axis accelerometer.

Figure 17:
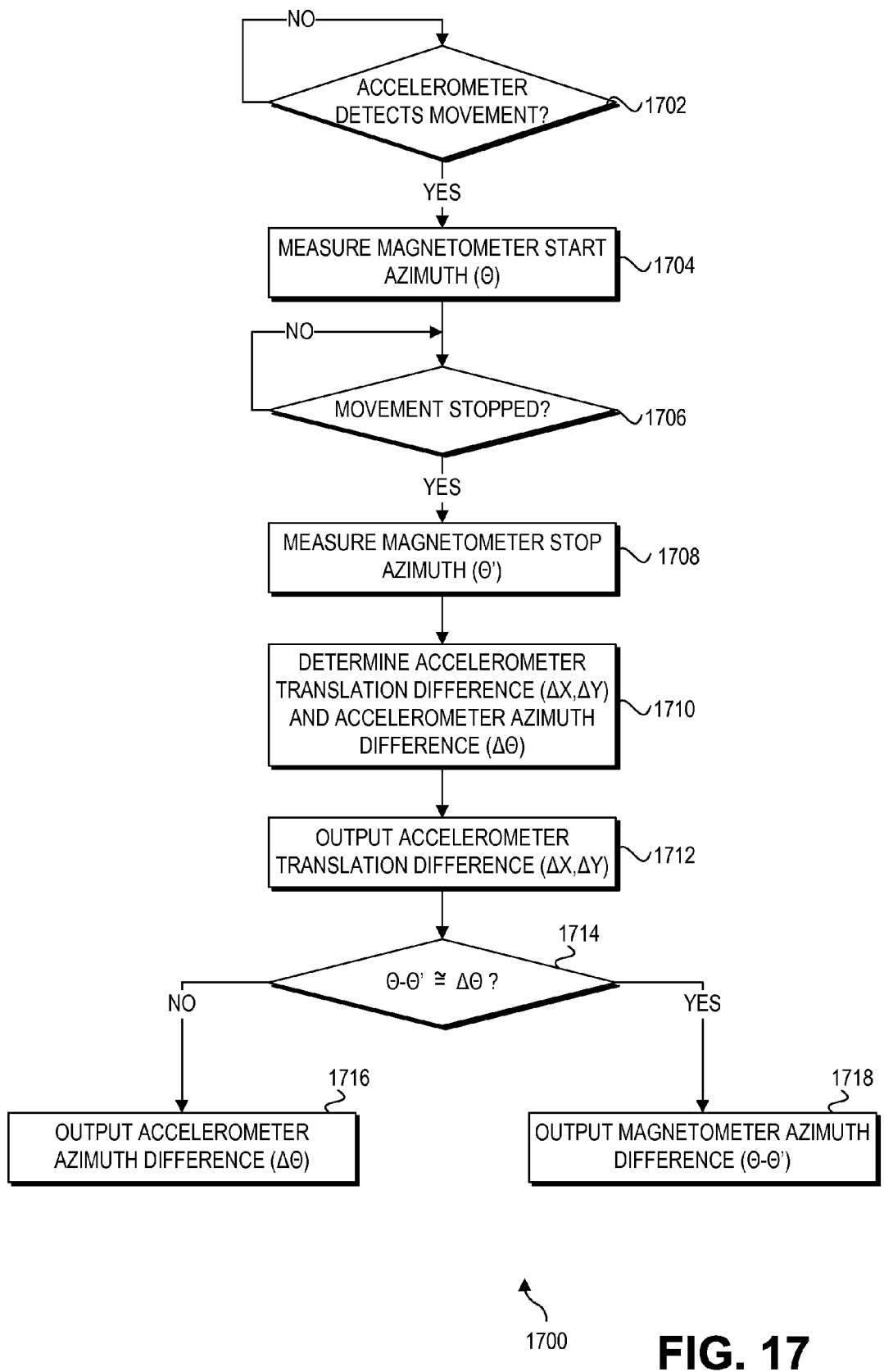
FIG. 17 is a flowchart showing the logic and operations of capture device movement compensation in accordance with an embodiment of the invention.

Turning to FIG. 17, a flowchart 1700 shows the logic and operations of capture device movement compensation in accordance with an embodiment of the invention. In one embodiment, the movement data is determined and output by the logic of flowchart 1700 during the live meeting. The logic of flowchart 1700 may be performed at device 1600, at a computing device coupled to device 1600, or any combination thereof. The movement data may be stored with the recorded meeting (such as in file 512) and then used for device motion compensation during post-processing of the recording.

Starting in decision block 1702, the logic waits for detection of movement of the capture device by the accelerometer. Once movement is detected, the logic proceeds to block 1704 where the magnetometer measures a start azimuth. In one embodiment, the measurement in block 1704 happens very quickly (e.g., <100 microseconds). In another embodiment, the measurement may be updated slowly before block 1702 and the last measurement made before block 1702 may be used as the measurement for block 1704. The last measurement made before block 1702 should be about the same (very close) to an actual measurement in block 1704. Continuing to decision block 1706, the logic uses the accelerometer to determine when the capture device motion has stopped.

Once the capture device motion has stopped, the logic proceeds to block 1708. In block 1708, the magnetometer measures a stop azimuth. Next, in block 1710, the translational difference is determined by the accelerometers and an azimuth change is determined by the accelerometers.

Proceeding to block 1712, the translation change of the capture device is outputted. Next, in decision block 1714, the logic determines if the azimuth change detected by the magnetometer is substantially equal to the azimuth change detected by the accelerometer. If the answer is no, then the logic proceeds to block 1716 where the accelerometer azimuth difference is outputted. If the answer to decision block 1714 is yes, then the magnetometer azimuth difference is outputted.

It will be appreciated that the magnetometer may provide a more reliable azimuth measurement than the accelerometer because the accelerometer may experience integration errors over time after several device movements. However, the magnetometer measurements are cross-checked with the accelerometer azimuth measurement (in decision block 1714) because the magnetometer is susceptible to error from artificial magnetic field changes, such as from a local Magnetic Resonance Imaging (MRI) machine.

Alternative embodiments of the invention may use only a magnetometer or only an accelerometer for detecting capture device movement. For example, a magnetometer may be used to measure device rotation while other means, such as vision-based models discussed above, may be used to determine translational movement. In an accelerometer only example, translation as well as azimuth changes may be detected and measured by one or more accelerometers.

Conclusion

Embodiments of the invention provide capture device movement compensation for speaker indexing. Vision-based techniques may use images captured by the capture device itself and hardware-based techniques may use magnetometers and/or accelerometers at the capture device. Embodiments herein provide reliable speaker indexing that in turn results in more robust speaker segmentation for viewing recorded meetings in a client UI.

It will be appreciated that vision-based techniques and/or hardware based techniques may be combined as desired for capture device movement compensation. Techniques may be combined to cross-check device movement data and consequently enhance the user experience. For example, movement data determined using stationary feature points may be compared to movement data determined using stationary edges in edge images. If the movement data determined by the two techniques differs by a threshold, then the techniques may be repeated or a different technique, such as object modeling, may be applied to ensure accurate speaker indexing.

Example Computing Environment

Figure 18:
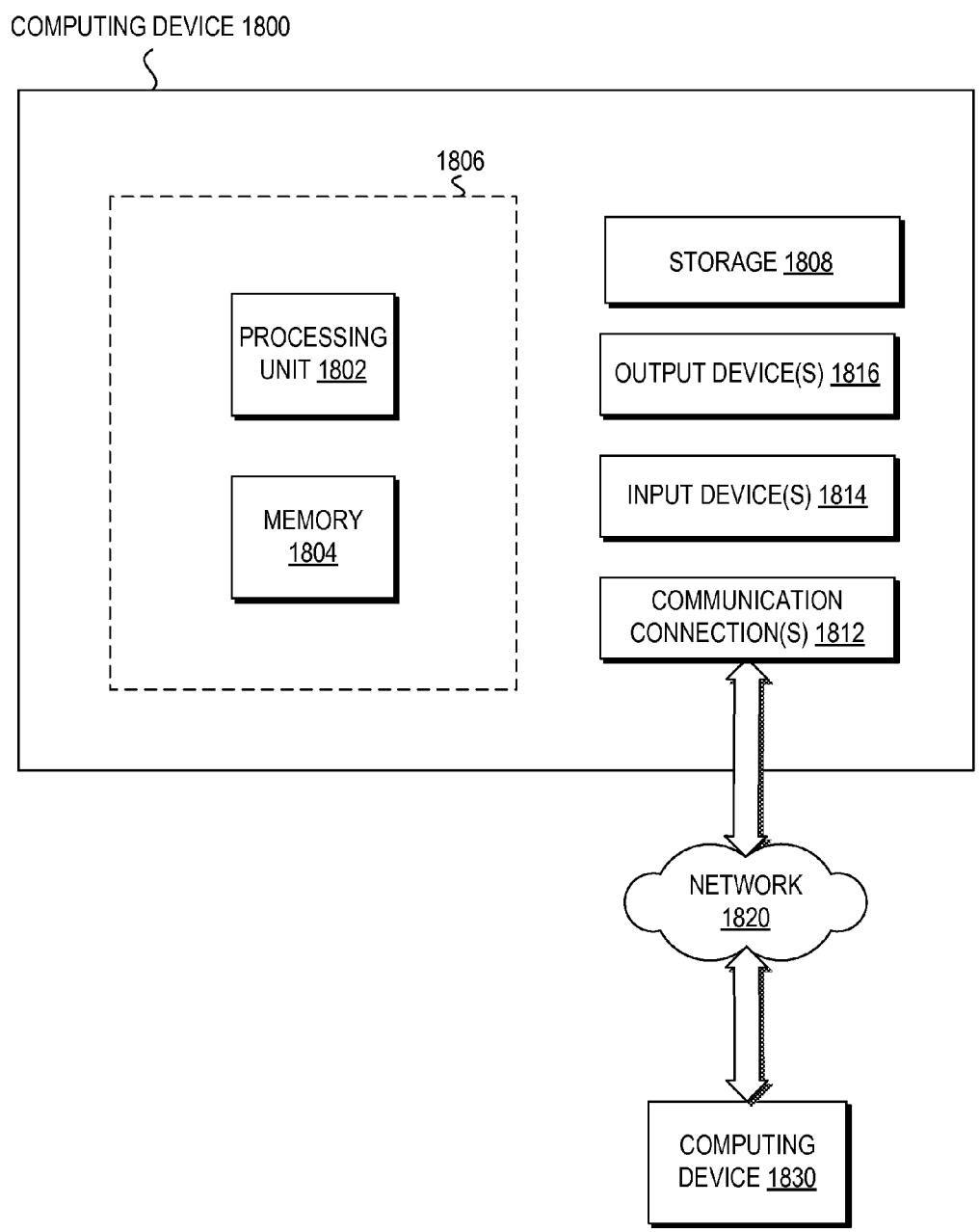
FIG. 18 is a block diagram of an example computing device for implementing embodiments of the invention.

FIG. 18 and the following discussion are intended to provide a brief, general description of a suitable computing environment to implement embodiments of the invention. The operating environment of FIG. 18 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 18 shows an example of a computing device 1800 for implementing one or more embodiments of the invention. Embodiments of computing device 1800 may be used to implement meeting room server 302, archived meeting server 306, client machines, or capture device 104. In one configuration, computing device 1800 includes at least one processing unit 1802 and memory 1804. Depending on the exact configuration and type of computing device, memory 1804 may be volatile (such as RAM), non-volatile (such as ROM, flash memory, etc.) or some combination of the two. This configuration is illustrated in FIG. 18 by dashed line 1806.

In other embodiments, device 1800 may include additional features and/or functionality. For example, device 1800 may also include additional storage (e.g., removable and/or non-removable) including, but not limited to, magnetic storage, optical storage, and the like. Such additional storage is illustrated in FIG. 18 by storage 1808. In one embodiment, computer readable instructions to implement embodiments of the invention may be in storage 1808. Storage 1808 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1804 and storage 1808 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1800. Any such computer storage media may be part of device 1800.

Device 1800 may also include communication connection(s) 1812 that allow device 1800 to communicate with other devices. Communication connection(s) 1812 may include, but is not limited to, a modem, a Network Interface Card (NIC), an integrated network interface, a radio frequency transmitter/receiver, an infrared port, a USB connection, or other interfaces for connecting computing device 1800 to other computing devices. Communication connection(s) 1812 may include a wired connection or a wireless connection. Communication connection(s) 1812 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 1800 may include input device(s) 1814 such as keyboard, mouse, pen, voice input device, touch input device, infrared cameras, video input devices, and/or any other input device. Output device(s) 1816 such as one or more displays, speakers, printers, and/or any other output device may also be included in device 1800. Input device(s) 1814 and output device(s) 1816 may be connected to device 1800 via a wired connection, wireless connection, or any combination thereof. In one embodiment, an input device or an output device from another computing device may be used as input device(s) 1814 or output device(s) 1816 for computing device 1800.

Components of computing device 1800 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1800 may be interconnected by a network. For example, memory 1804 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1830 accessible via network 1820 may store computer readable instructions to implement one or more embodiments of the invention. Computing device 1800 may access computing device 1830 and download a part or all of the computer readable instructions for execution. Alternatively, computing device 1800 may download pieces of the computer readable instructions, as needed, or some instructions may be executed at computing device 1800 and some at computing device 1830. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method for detecting movement of a capture device for speaker indexing, comprising:
   detecting movement of the capture device by an accelerometer at the capture device;
   determining an amount of translational movement of the capture device by the accelerometer; and
   applying the amount of translational movement to speaker indexing.

2. The method of claim 1, further comprising:
   measuring a first azimuth of the capture device by a magnetometer at the capture device when movement of the capture device is detected by the accelerometer;
   measuring a second azimuth of the capture device by the magnetometer when the accelerometer detects the movement of the capture device has stopped; and
   determining an amount of azimuthal movement between the first azimuth and the second azimuth.

3. The method of claim 2, further comprising:
   determining an amount of azimuthal movement of the capture device by the accelerometer;
   outputting the amount of azimuthal movement determined by the accelerometer when the amount of azimuthal movement determined by the magnetometer is not substantially equal to the amount of azimuthal movement determined by the accelerometer; and outputting the amount of azimuthal movement determined by the magnetometer when the amount of azimuthal movement determined by the magnetometer is substantially equal to the amount of azimuthal movement determined by the accelerometer.

4. The method of claim 1, further comprising:
   determining an amount of azimuthal movement of the capture device by the accelerometer; and
   outputting the amount of azimuthal movement determined by the accelerometer.

5. The method of claim 1, wherein the capture device records at least one of: audio or video.

6. The method of claim 1, further comprising determining an amount of azimuthal movement of the capture device.

7. The method of claim 1, wherein applying the amount of translational movement to speaker indexing comprises applying the amount of translational movement to speaker indexing of a recording captured by the capture device.

8. A computer-readable medium, excluding a signal, having computer-executable instructions for detecting movement of a capture device for speaker indexing, comprising:
   detecting movement of the capture device by an accelerometer at the capture device;
   determining an amount of translational movement of the capture device by the accelerometer; and
   applying the amount of translational movement to speaker indexing.

9. The computer-readable medium of claim 8, further comprising:
   measuring a first azimuth of the capture device by a magnetometer at the capture device when movement of the capture device is detected by the accelerometer;
   measuring a second azimuth of the capture device by the magnetometer when the accelerometer detects the movement of the capture device has stopped; and
   determining an amount of azimuthal movement between the first azimuth and the second azimuth.

10. The computer-readable medium of claim 9, further comprising:
    determining an amount of azimuthal movement of the capture device by the accelerometer;
    outputting the amount of azimuthal movement determined by the accelerometer when the amount of azimuthal movement determined by the magnetometer is not substantially equal to the amount of azimuthal movement determined by the accelerometer; and
    outputting the amount of azimuthal movement determined by the magnetometer when the amount of azimuthal movement determined by the magnetometer is substantially equal to the amount of azimuthal movement determined by the accelerometer.

11. The computer-readable medium of claim 8, further comprising:
    determining an amount of azimuthal movement of the capture device by the accelerometer; and
    outputting the amount of azimuthal movement determined by the accelerometer.

12. The computer-readable medium of claim 8, further comprising:
    wherein the recording is at least one of: an audio recording or a video recording captured by the capture device.

13. The computer-readable medium of claim 8, wherein applying the amount of translational movement to speaker indexing comprises applying the amount of translational movement to speaker indexing of a recording captured by the capture device.

14. A system for detecting movement of a capture device for speaker indexing, comprising:
    a processor and a computer-readable medium; and
    a process configured to perform actions, comprising:
    detecting movement of the capture device by an accelerometer at the capture device;
    determining an amount of translational movement of the capture device by the accelerometer; and
    applying the amount of translational movement to speaker indexing.

15. The system of claim 14, further comprising:
    measuring a first azimuth of the capture device by a magnetometer at the capture device when movement of the capture device is detected by the accelerometer;
    measuring a second azimuth of the capture device by the magnetometer when the accelerometer detects the movement of the capture device has stopped; and
    determining an amount of azimuthal movement between the first azimuth and the second azimuth.

16. The system of claim 15, further comprising:
    determining an amount of azimuthal movement of the capture device by the accelerometer;
    outputting the amount of azimuthal movement determined by the accelerometer when the amount of azimuthal movement determined by the magnetometer is not substantially equal to the amount of azimuthal movement determined by the accelerometer; and
    outputting the amount of azimuthal movement determined by the magnetometer when the amount of azimuthal movement determined by the magnetometer is substantially equal to the amount of azimuthal movement determined by the accelerometer.

17. The system of claim 14, further comprising:
    determining an amount of azimuthal movement of the capture device by the accelerometer; and
    outputting the amount of azimuthal movement determined by the accelerometer.

18. The system of claim 14, wherein the recording is at least one of: an audio recording or a video recording captured by the capture device.

19. The system of claim 14, further comprising determining an amount of azimuthal movement of the capture device.

20. The system of claim 14, wherein applying the amount of translational movement to speaker indexing comprises applying the amount of translational movement to speaker indexing of a recording captured by the capture device.

* * * * *